(12) United States Patent
Hotta et al.

(10) Patent No.: US 10,697,378 B2
(45) Date of Patent: Jun. 30, 2020

(54) CONTROL SYSTEM OF MILLER CYCLE ENGINE AND METHOD OF CONTROLLING MILLER CYCLE ENGINE

(71) Applicant: TOYOTA JIDOSHA KABUSHIKI KAISHA, Toyota-shi, Aichi-ken (JP)

(72) Inventors: Shintaro Hotta, Susono (JP); Shinji Sadakane, Susono (JP); Fumio Takamiya, Gotemba (JP); Akira Hojo, Susono (JP); Kohei Umehara, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/546,777

(22) Filed: Aug. 21, 2019

(65) Prior Publication Data
US 2020/0072135 A1    Mar. 5, 2020

(30) Foreign Application Priority Data

Sep. 4, 2018 (JP) .................................. 2018-165259

(51) Int. Cl.
*F01L 1/34* (2006.01)
*F02D 13/02* (2006.01)

(52) U.S. Cl.
CPC ....... *F02D 13/0257* (2013.01); *F02D 13/023* (2013.01)

(58) Field of Classification Search
CPC .......................... F02D 13/0257; F02D 13/023
See application file for complete search history.

(56) References Cited

U.S. PATENT DOCUMENTS

| | | | |
|---|---|---|---|
| 6,341,584 B1 | 1/2002 | Itoyama et al. | |
| 2006/0144356 A1* | 7/2006 | Sellnau | F02D 41/3035 123/90.16 |
| 2013/0276756 A1 | 10/2013 | Leone et al. | |

FOREIGN PATENT DOCUMENTS

| | | |
|---|---|---|
| DE | 199 53 856 A1 | 5/2000 |
| JP | 2002-061522 A | 2/2002 |
| JP | 2016-205195 A | 12/2016 |

* cited by examiner

*Primary Examiner* — Zelalem Eshete
(74) *Attorney, Agent, or Firm* — Oliff PLC (57) ABSTRACT

A control system of a Miller cycle engine includes an ECU. The ECU executes an early closing Miller cycle operating mode in which a variable valve mechanism is controlled to close an intake valve before an intake bottom dead center. The ECU executes a decompression mode in which the variable valve mechanism is controlled to close the intake valve at a point later than the intake BDC, when the engine is started. The electronic control unit executes the early closing Miller cycle operating mode after completion of the decompression mode. A later closing amount of the intake valve relative to the intake BDC, for use in the decompression mode, is larger than an early closing amount of the intake valve relative to the intake BDC when the closing timing of the intake valve is most advanced.

8 Claims, 8 Drawing Sheets

CONTROL SYSTEM OF MILLER CYCLE ENGINE AND METHOD OF CONTROLLING MILLER CYCLE ENGINE

INCORPORATION BY REFERENCE

The disclosure of Japanese Patent Application No. 2018-165259 filed on Sep. 4, 2018 including the specification, drawings and abstract is incorporated herein by reference in its entirety.

BACKGROUND

1. Technical Field

The disclosure relates to a Miller cycle engine, and more specifically relates to a control system of the Miller cycle engine, which implements an early closing Miller cycle operating mode, using a variable valve mechanism that makes the opening and closing timing of an intake valve variable while fixing the operation angle of the intake valve. The disclosure also relates to a method of controlling the Miller cycle engine.

2. Description of Related Art

For example, Japanese Unexamined Patent Application Publication No. 2002-061522 (JP 2002-061522 A) discloses a control system of an internal combustion engine including a variable valve mechanism (which will also be simply called "variable operation angle type mechanism") having a function of making the operation angle (valve-opening period) and lift amount of an intake valve variable, and a function of making the center angle of the lift variable. During operation of the internal combustion engine, an early closing Miller cycle operating mode is implemented in which the intake valve is closed at a point earlier than the intake bottom dead center, using the variable valve mechanism. When the engine is started, the closing timing of the intake valve is advanced to be largely earlier than the intake bottom dead center, so as to provide a decompression function. By using the variable operation angle type mechanism, it is possible to advance the closing timing, while adjusting the opening timing to a desired timing.

SUMMARY

In order to implement the early closing Miller cycle operating mode while reducing the cost of a valve operating system, it may be considered to use a variable valve mechanism (which will also be simply called "fixed operation angle type mechanism") that makes the opening and closing timing of the intake valve variable, while fixing the operation angle of the intake valve. When the closing timing is advanced for execution of the decompression mode, using the fixed operation angle type mechanism, the opening timing is also advanced as the closing timing is advanced. As a result, the valve lift amount at around the exhaust top dead center is increased, which makes it necessary to deepen the valve recess of a piston so as to avoid contact between the piston and the valve. However, the enlargement of the valve recess may result in combustion deterioration due to reduction of turbulence of in-cylinder gas, for example.

The disclosure provides a control system of a Miller cycle engine and a method of controlling the Miller cycle engine, which can establish a decompression mode without requiring enlargement of a valve recess, in a Miller cycle engine that is operable in an early closing Miller cycle operating mode, using a variable valve mechanism of a fixed operation angle type.

A first aspect of the disclosure is a control system of a Miller cycle engine including a variable valve mechanism. The variable valve mechanism is configured to make an opening timing and a closing timing of an intake valve variable while fixing an operation angle of the intake valve. The control system includes an electronic control unit. The electronic control unit is configured to execute an early closing Miller cycle operating mode in which the electronic control unit controls the variable valve mechanism to close the intake valve before an intake bottom dead center. The electronic control unit is configured to execute a decompression mode in which the electronic control unit controls the variable valve mechanism to close the intake valve at a point later than the intake bottom dead center, when the Miller cycle engine is started, and execute the early closing Miller cycle operating mode after completion of the decompression mode. In the control system, a later closing amount of the intake valve relative to the intake bottom dead center, for use in the decompression mode, is larger than an early closing amount of the intake valve relative to the intake bottom dead center at a time when the closing timing of the intake valve is most advanced by the variable valve mechanism.

In the control system as described above, the electronic control unit may be configured to control the variable valve mechanism such that the intake valve is closed at a point later than the intake bottom dead center, only when the decompression mode is executed.

In the control system as described above, the electronic control unit may be configured to execute a high intake efficiency mode, in place of the early closing Miller cycle operating mode, in a high output region of the Miller cycle engine. In the high intake efficiency mode, the intake valve may be closed at a specific closing timing that is on a retard side of the intake bottom dead center and provides the highest intake efficiency of intake air at the same engine speed, or at a closing timing that is later than the intake bottom dead center and earlier than the specific closing timing. The electronic control unit may be is configured to control the variable valve mechanism such that the intake valve is closed at a point later than the specific closing timing, only when the decompression mode is executed.

The Miller cycle engine may include a throttle valve placed in an intake passage. The electronic control unit may be configured to perform switching from the decompression mode to the early closing Miller cycle operating mode, after a pressure in the intake passage downstream of the throttle valve is reduced to a level equal to or lower than a threshold value for the first time after completion of engine start-up.

The variable valve mechanism may be an electric variable valve timing mechanism including an electric motor that changes a rotation phase of a camshaft relative to a rotation phase of a crankshaft. In the control system, the late closing amount used in the decompression mode may be equal to or larger than 90° and smaller than 180° in crank angle.

In the control system as described above, the operation angle of the intake valve may be within a range of 170° to 200° in crank angle.

In the control system as described above, a lift amount of the intake valve may be within a range of 6 to 10 mm.

A second aspect of the disclosure is a method of controlling a Miller cycle engine. The Miller cycle engine includes an electronic control unit, and a variable valve mechanism. The variable valve mechanism is configured to make an opening timing and a closing timing of an intake valve variable while fixing an operation angle of the intake valve. The method includes: executing, by the electronic control unit, an early closing Miller cycle operating mode such that the variable valve mechanism is controlled to close the intake valve before an intake bottom dead center; executing, by the electronic control unit, a decompression mode such that the variable valve mechanism is controlled to close the intake valve at a point later than the intake bottom dead center, when the Miller cycle engine is started; and executing, by the electronic control unit, the early closing Miller cycle operating mode after completion of the decompression mode. In the control method, a later closing amount of the intake valve relative to the intake bottom dead center, for use in the decompression mode, is larger than an early closing amount of the intake valve relative to the intake bottom dead center at a time when the closing timing of the intake valve is most advanced by the variable valve mechanism.

According to the above configuration, the decompression mode utilizing late closing of the intake valve is implemented, in the Miller cycle engine that is operable in the early closing Miller cycle operating mode by using the variable valve mechanism of the fixed operation angle type. The late closing amount for use in the decompression mode is larger than the early closing amount at the time when the closing timing of the intake valve is most advanced (advanced to the earliest timing) by the variable valve mechanism. By executing the decompression mode with the late closing amount, it is possible to perform decompression that provides a higher pressure reduction effect than that at the time of use of the early closing amount when the closing timing is most advanced, without requiring enlargement of a valve recess. Thus, even when a mechanism of a variable operation angle type is not provided, both the early closing Miller cycle operating mode and the decompression mode can be established, without incurring an adverse effect due to enlargement of the valve recess.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

When the number of pieces, quantity, range, etc. of each element are mentioned in the description of the embodiments below, the disclosure is not limited to the number of pieces, quantity, range, etc., except when explicitly stated as such, or clearly specified in principle. Also, the structures, steps, etc. described in the embodiments below are not necessarily essential to this disclosure, except when explicitly stated as being essential, or clearly specified in principle.

1. First Embodiment

Referring initially to FIG. 1 through FIG. 8, a first embodiment of the disclosure will be described.

1-1. System Configuration

Figure 1:
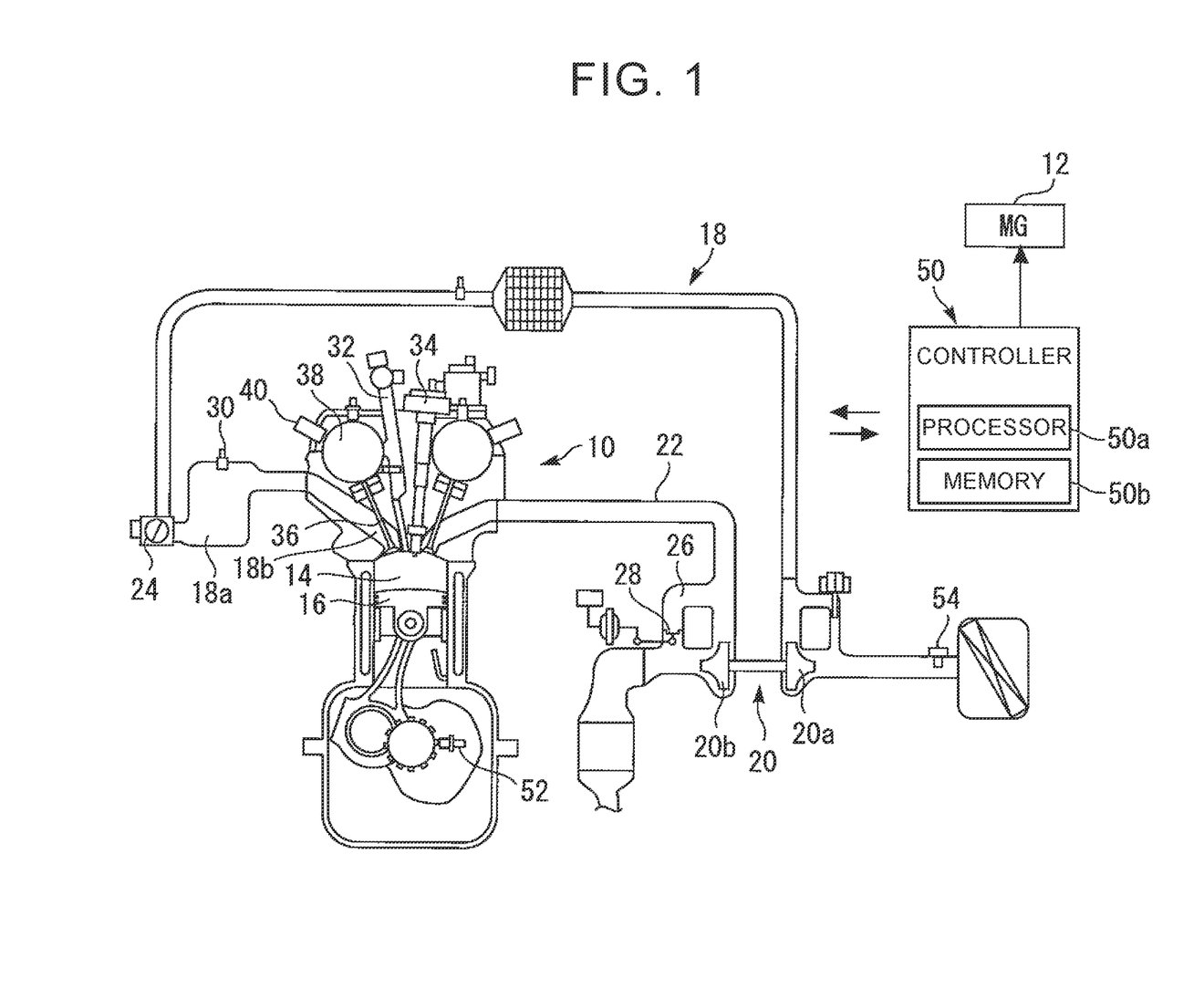
FIG. 1 is a view illustrating the configuration of a system according to a first embodiment of the disclosure.

FIG. 1 illustrates the configuration of a system according to the first embodiment. The system shown in FIG. 1 includes a spark ignition internal combustion engine (e.g., gasoline engine) 10, as one example. A vehicle on which the internal combustion engine 10 is installed is, for example, a hybrid vehicle including the internal combustion engine 10 and a motor generator (MG) 12 as power sources.

A piston 16 is placed in each cylinder 14 of the internal combustion engine 10. The piston 16 reciprocates within the cylinder 14. The internal combustion engine 10 is a supercharged engine, for example, and a compressor 20a of a turbocharger 20 is placed in the intake passage 18. The compressor 20a is driven and rotated by a turbine 20b placed in an exhaust passage 22. An electronically controlled throttle valve 24 is placed downstream of the compressor 20a. An exhaust bypass passage 26 that bypasses the turbine 20b is connected to the exhaust passage 22. A wastegate valve (WGV) 28 for controlling the supercharging pressure is placed in the exhaust bypass passage 26.

An intake pressure sensor 30 is placed in a collecting portion (surge tank) of an intake manifold 18a located downstream of the throttle valve 24. The intake pressure sensor 30 is operable to output a signal indicative of a pressure (which will be simply referred to as "intake pressure") in the intake passage 18 downstream of the throttle valve 24. The internal combustion engine 10 also includes a fuel injection valve 32 placed in each cylinder 14, and an ignition device 34. The fuel injection valve 32 injects fuel directly into the cylinder 14, for example.

Each intake valve 36 that opens and closes a corresponding intake port 18b is driven by a variable valve mechanism 38. The variable valve mechanism 38 is an electric variable valve timing mechanism (which will be simply referred to as "electric VVT") capable of changing the rotation phase of a camshaft relative to the rotation phase of a crankshaft, using an electric motor (not shown). The electric VVT 38 can continuously change the opening and closing timing (phase of a valve-opening period) of the intake valve 36 within a predetermined control range, while fixing the operation angle (valve-opening period (more specifically, the width of the crank angle over which the intake valve 36 is open)) of the intake valve 36. A cam angle sensor 40 that outputs a signal indicative of the rotation phase (cam angle) of the camshaft is placed around the camshaft.

Further, the system of this embodiment includes a controller 50 that controls the internal combustion engine 10 and the MG 12. The controller 50 is an electronic control unit (ECU) having a processor 50a and a memory 50b. The memory 50b stores programs for controlling the internal combustion engine 10 and the MG 12. The processor 50a reads the programs from the memory 50b, and executes the programs. The controller 50 may consist of two or more ECUs.

The controller 50 receives sensor signals from various sensors. The various sensors include a crank angle sensor 52 and an air flow sensor 54, for example, in addition to the above-mentioned intake pressure sensor 30 and cam angle sensor 40. The crank angle sensor 52 and the air flow sensor 54 output signals indicative of the crank angle and the intake air flow in the intake passage 18, respectively. The controller 50 can calculate the engine speed NE, using the signal from the crank angle sensor 52. Also, the processor 50a executes various programs, using the sensor signals received, and outputs operation signals for operating the above-indicated actuators (i.e., the throttle valve 24, WGV 28, fuel injection valve 32, ignition device 34, and electric VVT 38).

1-2. Intake Valve Timing Control of First Embodiment

1-2-1. Early Closing Miller Cycle Operating Mode

Engine control performed by the controller 50 includes intake valve timing control (control of the closing timing IVC of the intake valve 36) using the electric VVT 38. Under the intake valve timing control, the controller 50 implements an "early closing Miller cycle operating mode" during engine operation. In the following description, the early closing Miller cycle operating mode will be abbreviated to "early closing mode" when appropriate.

The early closing mode is implemented by controlling the electric VVT 38 so as to close the intake valve 36 early, namely, before the intake bottom dead center (which will be simply called "BDC"). Namely, the internal combustion engine 10 is a "Miller cycle engine" utilizing early closing of the intake valve 36. In the early closing mode, the early closing amount (angle of advance) of the closing timing IVC of the intake valve 36 relative to the BDC is changed according to engine operating conditions. Generally, the early closing amount of the closing timing IVC is controlled to increase as the required engine power is lower. On the other hand, as the required engine power is higher, the early closing amount is controlled to decrease (namely, the closing timing IVC becomes closer to the BDC) so as to increase the intake efficiency (charging efficiency) of the intake air. The "early closing amount" means the angle of advance (=IVC−BDC>0) of the closing timing IVC relative to the BDC.

1-2-2. Regarding Decompression

When the engine starts (more specifically, during cranking), decompression for releasing the compression pressure in the cylinder is performed, so as to reduce vehicle floor vibration caused by resonance of a powertrain (the internal combustion engine and a power transmission system connected to the engine). In the following, the decompression at the time of engine start in the early closing Miller cycle engine using "a fixed operation angle type mechanism" like the electric VVT 38 will be described, referring to FIG. 2 to FIG. 4.

Figure 2:
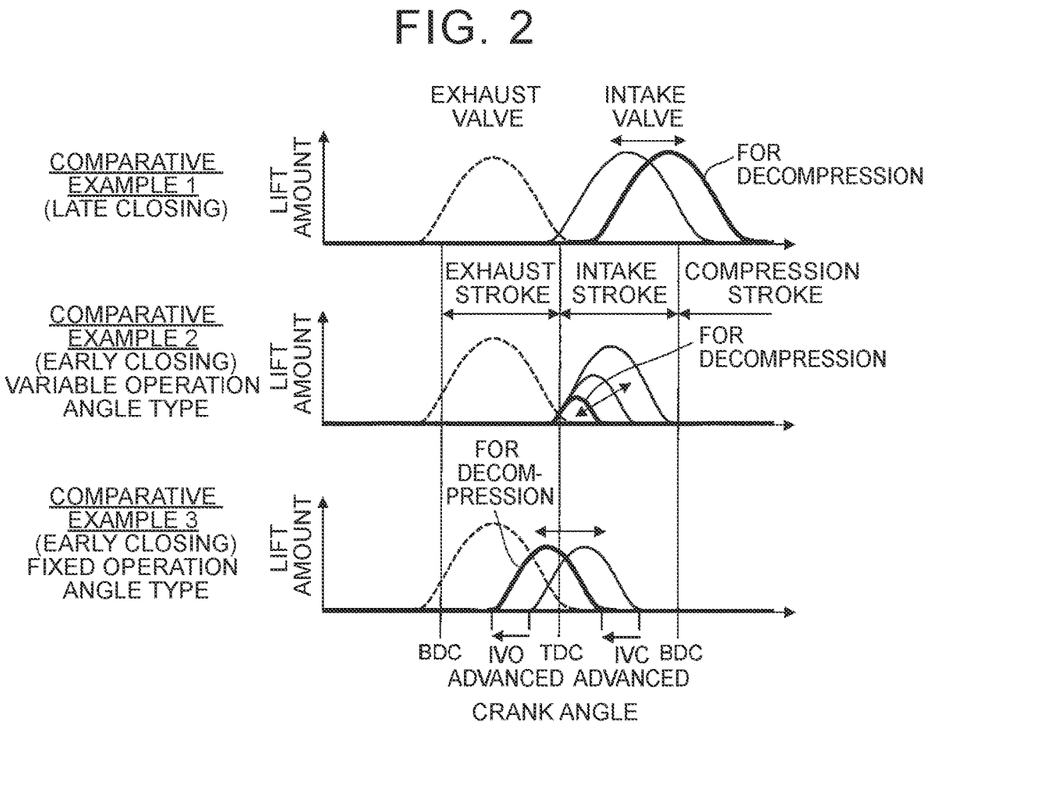
FIG. 2 is a view showing three comparative examples 1 to 3 in which decompression is performed.

FIG. 2 illustrates three comparative examples 1, 2, and 3 in which decompression is performed. Initially, in Comparative Example 1 in the upper section of FIG. 2, a late closing Miller cycle (late closing Atkinson cycle) operating mode is implemented by closing the intake valve late, namely, after the BDC. In this example, the closing timing IVC is changed within a predetermined control range on the late closing side (later than the BDC) as shown in FIG. 2, using the fixed operation angle type mechanism. Then, when decompression is performed, the closing timing IVC is most retarded within the control range. Namely, in this example, the decompression is realized by increasing the late closing amount of the closing timing IVC. The "late closing amount" means the amount of retard (=IVC−BDC>0) of the closing timing IVC relative to the BDC.

Comparative Example 2 in the middle section of FIG. 2 is an example in which the early closing mode is implemented. In this example, however, a "variable operation angle type" mechanism is used, unlike this embodiment. The closing timing IVC in this example is changed within a predetermined control range on the early closing side (earlier than the BDC) as shown in FIG. 2, by changing the operation angle (and lift amount) without largely changing the opening timing IVO. Then, in this example, the decompression is realized by increasing the early closing amount of the closing timing IVC so that the early closing amount becomes equivalent to the late closing amount of Comparative Example 1.

Comparative Example 3 in the lower section of FIG. 2 is an example in which the early closing mode is implemented, using the "fixed operation angle type" mechanism, like this embodiment. Through the use of the fixed operation angle type, the cost of the variable valve mechanism can be reduced to be lower than that of Comparative Example 2. As described above, decompression under the known intake valve timing control is realized by increasing the late closing amount in Comparative Example 1 utilizing late closing, and is realized by increasing the early closing amount in Comparative Example 2 utilizing early closing. According to the known points of view, decompression is realized by increasing the early closing amount, in Comparative Example 3 as one example utilizing early closing.

When the closing timing IVC is advanced for the sake of decompression in Comparative Example 3 using the fixed operation angle type mechanism, the opening timing IVO is also advanced in accordance with advance of the closing timing IVC. As a result, the valve lift amount at around the exhaust top dead center (TDC) is increased. This means that the valve recess of the piston required for avoiding contact between the piston and the valve is enlarged (deepened).

Figure 3:
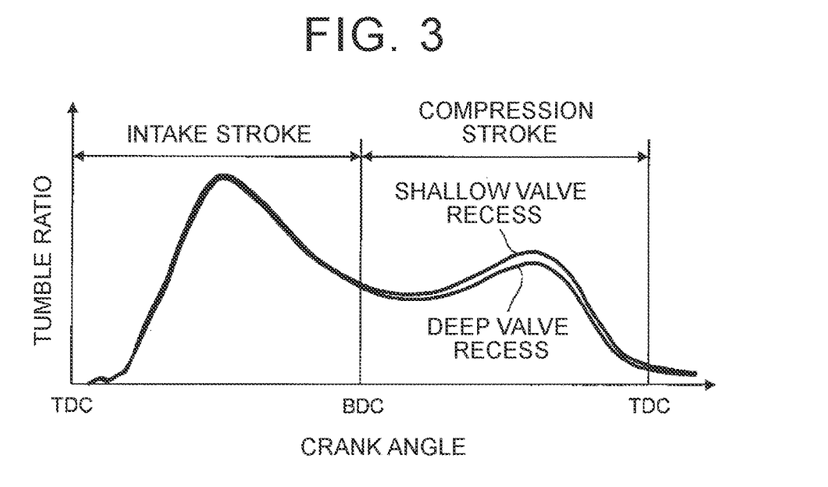
FIG. 3 is a view showing the relationship between the tumble ratio and the depth of a valve recess on an intake stroke and a compression stroke.

FIG. 3 shows the relationship between the tumble ratio and the depth of the valve recess on the intake stroke and the compression stroke. More specifically, FIG. 3 shows the result of simulation of a difference in the tumble ratio (the intensity of tumble flow) due to a difference in the depth of the valve recess, with respect to two pistons with valve recesses having different depths. As shown in FIG. 3, basically, the tumble ratio initially increases as intake air flows in through the intake port on the intake stroke, and then decreases once. Then, the tumble ratio increases again, since gas flow directed upward in the cylinder is intensified due to a rise of the piston on the compression stroke. As a result, the tumble flow is retained until the latter half of the compression stroke.

The difference in the depth of the valve recess mainly has an influence on the tumble ratio during the compression stroke. Specifically, as the valve recess is deeper, the upward gas flow in the cylinder is less likely to be intensified, resulting in reduction of the tumble ratio. More specifically, in order to make the valve recess deeper while keeping an equal compression ratio, it is necessary to elevate the position of a portion (mainly, a center portion of the piston top face) other than the valve recess on the piston top face. This means reduction of the distance between an ignition plug located in the middle of a top portion of a combustion chamber, and the piston top face, when compared at the same crank angle. As the distance between the plug and the piston top face is smaller, rotation of the tumble flow is more likely to be impeded during the compression stroke. Consequently, the tumble ratio is reduced.

Figure 4:
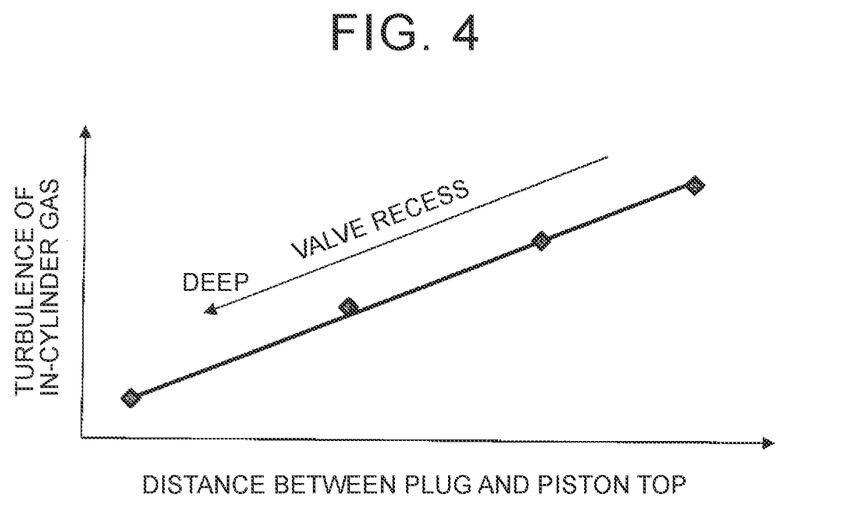
FIG. 4 is a view showing the relationship between turbulence of in-cylinder gas and the distance between an ignition plug and a top face of a piston.

FIG. 4 shows the relationship between turbulence of in-cylinder gas and the distance between the ignition plug and the piston top face. More specifically, the "turbulence of in-cylinder gas" means the average turbulence velocity [m/s] of in-cylinder gas. If the tumble ratio is low in the latter half of the compression stroke, turbulence of in-cylinder gas generated due to collapse of tumble flow at around the compression top dead center is weakened. Accordingly, as shown in FIG. 4, as the distance between the ignition plug and the piston top face is smaller (namely, as the valve recess is deeper), the turbulence of the in-cylinder gas is weakened since the tumble ratio on the compression stroke is reduced. Then, the reduction of the turbulence of the in-cylinder gas results in reduction of the combustion speed (combustion deterioration).

The reason why the combustion deterioration due to enlargement of the valve recess during use of early closing Miller cycle operation is more pronounced or marked, as compared with late closing Miller cycle operation, will be described. First, early closing Miller cycle operation has an advantage that the compression end temperature can be reduced, as compared with late closing Miller cycle operation. Meanwhile, assuming that the fixed operation angle type mechanism is used, the operation angle of the intake valve required for realizing early closing Miller cycle operation is smaller than the operation angle used for late closing Miller cycle operation. As the operation angle is smaller, the lift amount is basically reduced in accordance with the reduction of the operation angle. Therefore, when the early closing Miller cycle operation is used, the turbulence of in-cylinder gas is more likely to be reduced due to reduction of the tumble ratio during the intake stroke, which is caused by reduction of the lift amount, as compared with the case where late closing Miller cycle operation is used. Thus, since the turbulence of in-cylinder gas is inherently likely to be reduced in early closing Miller cycle operation, the combustion deterioration due to enlargement of the valve recess becomes more pronounced if the decompression mode is implemented with early closing, using the fixed operation angle type mechanism.

1-2-3. Summary of Intake Valve Timing Control of First Embodiment

Figure 5:
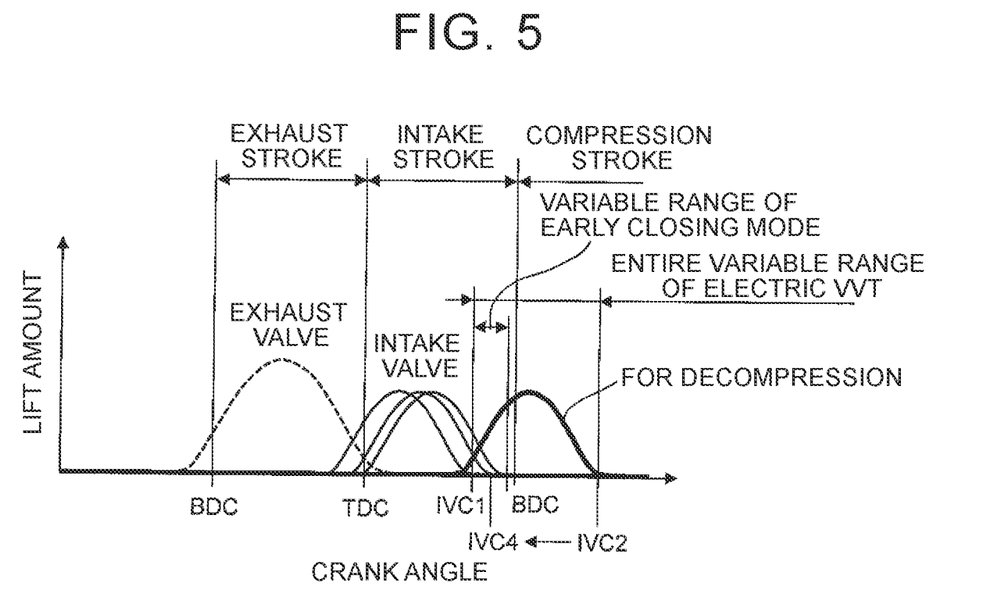
FIG. 5 is a view useful for describing the relationship between an early closing Miller cycle operating mode and a decompression mode according to the first embodiment of the disclosure.

FIG. 5 shows the relationship between the early closing Miller cycle operating mode and the decompression mode according to the first embodiment.

In this embodiment using the electric VVT 38 of the "fixed operation angle type", the early closing mode is executed during engine operation, as described above. Then, in the decompression mode in which decompression is performed at the time of engine start, the electric VVT 38 is controlled so as to close the intake valve 36 later than the BDC, as shown in FIG. 5. Then, the closing timing IVC is controlled to the early closing side after completion of the decompression mode, though details will be described later with reference to FIG. 7.

More specifically, in the early closing mode, the closing timing IVC is changed according to the engine operating conditions, within a predetermined variable range on the advance side of the BDC, as indicated in FIG. 5 by way of example. Namely, in this embodiment, the closing timing IVC is not retarded to be later than the BDC during execution of the early closing mode, but is retarded to be later than the BDC only during execution of the decompression mode. Thus, in the internal combustion engine 10 as a Miller cycle engine utilizing early closing, late closing of the closing timing IVC is exceptionally carried out in the decompression mode.

Figure 6:
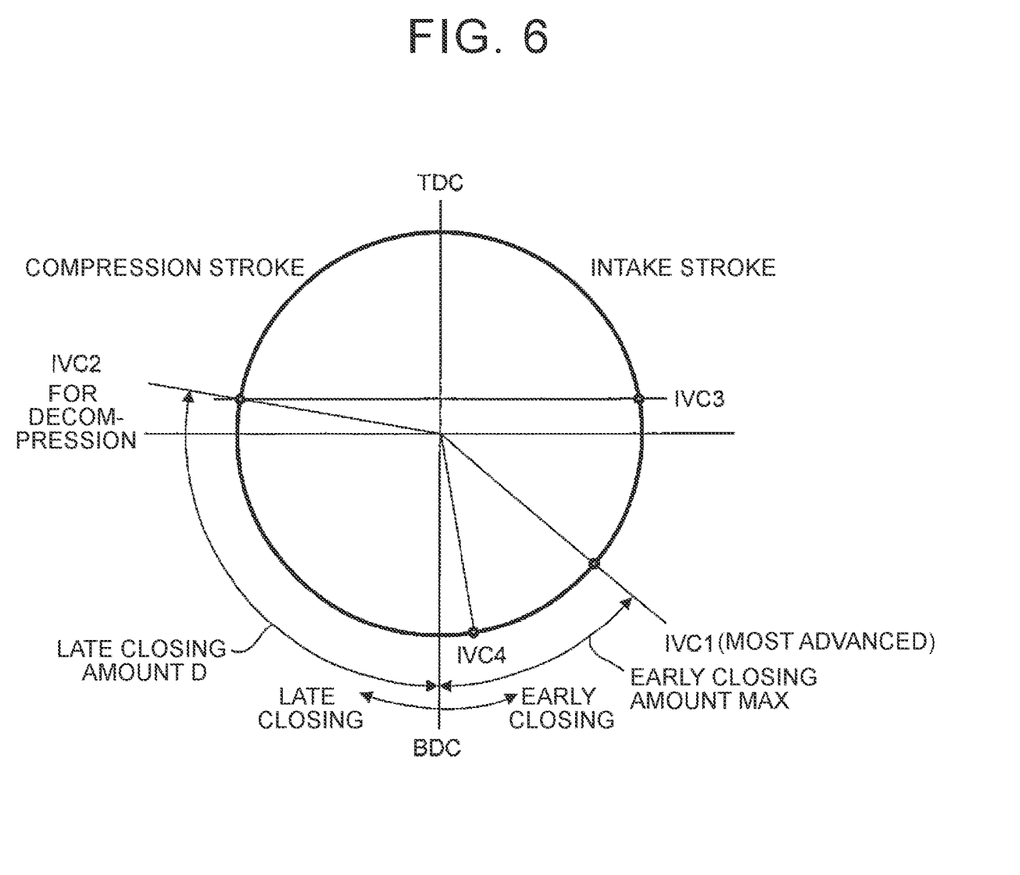
FIG. 6 is a view showing setting and control range of closing timing IVC used in intake valve timing control of the first embodiment of the disclosure.

FIG. 6 shows setting and control range of the closing timing IVC used in the intake valve timing control of the first embodiment. In FIG. 5 and FIG. 6, the closing timing IVC1 at the time when the early closing amount is largest (when the timing is most advanced) and the closing timing IVC2 in the decompression mode are indicated. The electric VVT 38 can continuously change the closing timing IVC within a range from the closing timing IVC1 to the closing timing IVC2.

The closing timing IVC2 used in the decompression mode in this embodiment is specified in the manner as follows, in comparison with the closing timing IVC1 as the most advanced timing. Namely, the late closing amount D (=IVC2−BDC>0) in the decompression mode is larger than the early closing amount MAX (=IVC1−BDC>0) at the time when the closing timing is most advanced. In one example shown in FIG. 6, the closing timing IVC1 is −50° after the bottom dead center (−50° ABDC), and the closing timing IVC2 is 100° ABDC.

Also, the closing timing IVC3 in FIG. 6 corresponds to the closing timing needed to realize, through early closing, decompression that provides substantially the same pressure reduction effect as the closing timing IVC2 on the late closing side. If control of the closing timing IVC, including the decompression mode, is to be completed on the early closing side, in the Miller cycle engine that performs early closing using the "fixed operation angle type" mechanism (Comparative Example 3 in FIG. 2), the engine needs to be configured such that the closing timing IVC can be advanced up to the closing timing IVC3. Namely, the valve recess needs to be enlarged. On the other hand, according to this embodiment in which the decompression mode is implemented with the late closing amount D specified as described above, the decompression can be accomplished at substantially the same pressure reduction level as that of the closing timing IVC3, without requiring the limit value of the closing timing on the advance side to be advanced to be earlier than the closing timing IVC1.

Also, the closing timing IVC4 in FIG. 5 and FIG. 6 is one example of the closing timing IVC used when the early closing mode is started after the end of the decompression mode. More specifically, the closing timing IVC4 is set close to the BDC, for improvement of the startability due to improvement of the actual compression ratio (effective compression ratio). After the decompression mode ends, the closing timing IVC is changed from IVC2 to IVC4, passing over the BDC.

Specific Example of Change Amount of Closing Timing IVC

Referring further to FIG. 6, a specific example of the amount of change of the closing timing IVC associated with execution of the decompression mode according to this embodiment will be described.

The electric VVT 38 of the "fixed operation angle type" used in this embodiment is able to change the closing timing IVC over a certain broad variable range, by selecting the gear ratio of the electric motor and the camshaft. An example of the variable range (=IVC2−IVC1) shown in FIG. 6 is 150°. In this embodiment, the electric VVT 38 as described above is used, so as to ensure a large late closing amount D (100° in one example shown in FIG. 6) within a range equal to or larger than 90° and smaller than 180°, for the decompression mode.

Accordingly, when the decompression mode is executed, the closing timing IVC is controlled, from the closing timing IVC on the early closing side according to the early closing mode to the closing timing IVC2, so that the late closing amount D within the range equal to or larger than 90° and smaller than 180° can be obtained. In other words, the closing timing IVC is controlled to skip the third quadrant (0°<IVC<90° ABDC) as one of the four quadrants on the plane of coordinates in FIG. 6, and reach the closing timing IVC2 within the fourth quadrant (90°<IVC<180° ABDC) or equal to 90° ABDC. When the decompression mode ends, too, the closing timing IVC is controlled, from the closing timing IVC2 to the closing timing (IVC4, in the example shown in FIG. 6) on the early closing side according to the early closing mode, while skipping the third quadrant.

Specific Examples of Operation Angle and Lift Amount of Intake Valve

One type of valve lift curve can be used when the early closing mode is executed using the mechanism of the fixed operation angle type. Accordingly, the system is required to select an operation angle that can achieve a desired early closing amount while preventing the opening timing IVO from being excessively advanced. To meet this requirement, the operation angle in the example of early closing is inevitably smaller than that in the example of late closing, as is understood from comparison of the operation angle of the intake valve between Comparative Example 1 of late closing and Comparative Example 3 of early closing in FIG. 2. In the meantime, when the mechanism of the fixed operation angle type is used, one valve lift curve is required to appropriately cover a broad engine operation region from a low output region to a high output region (region in which it is highly required to ensure a large amount of air). In view of the latter requirement, a limitation is placed on reduction of the operation angle.

Generally, a value that can be used as the operation angle of the intake valve 36 of this embodiment which is controlled by the electric VVT 38 of the fixed operation angle type is not limited to any particular value. On that basis, numeral values considered by the inventor of this disclosure as a preferable operation angle of the intake valve 36 where the above two requirements are taken into consideration are 170° to 200° in crank angle. In one example shown in FIG. 5, 180° included in this range of numerical values is used as the operation angle of the intake valve 36.

In addition, the shape of the valve lift curve of the intake valve is mainly specified by the lift amount, as well as the operation angle. More specifically, the lift amount mentioned herein indicates the maximum lift amount on the valve lift curve. Generally, a value that can be used as the lift amount of the intake valve 36 is not limited to any particular value. On that basis, the lift amount cannot be freely selected, when the operation angle is selected within the range of 170° to 200° as described above. Namely, the lift amount that can be selected is restricted according to the selected operation angle, with the objective of avoiding occurrence of abnormal behavior (jumping or bouncing) of the intake valve 36, for example. Then, in selecting the lift amount in the case where the operation angle is selected within the range of 170° to 200°, numeral values considered by the inventor as a preferable lift amount when the latter requirement is taken into consideration are 6 to 10 mm. In one example shown in FIG. 5, 8 mm included in this range of numerical values is used as the lift amount (maximum lift amount) of the intake valve 36.

1-2-4. Operation Example of Intake Valve Timing Control upon Engine Start

Figure 7:
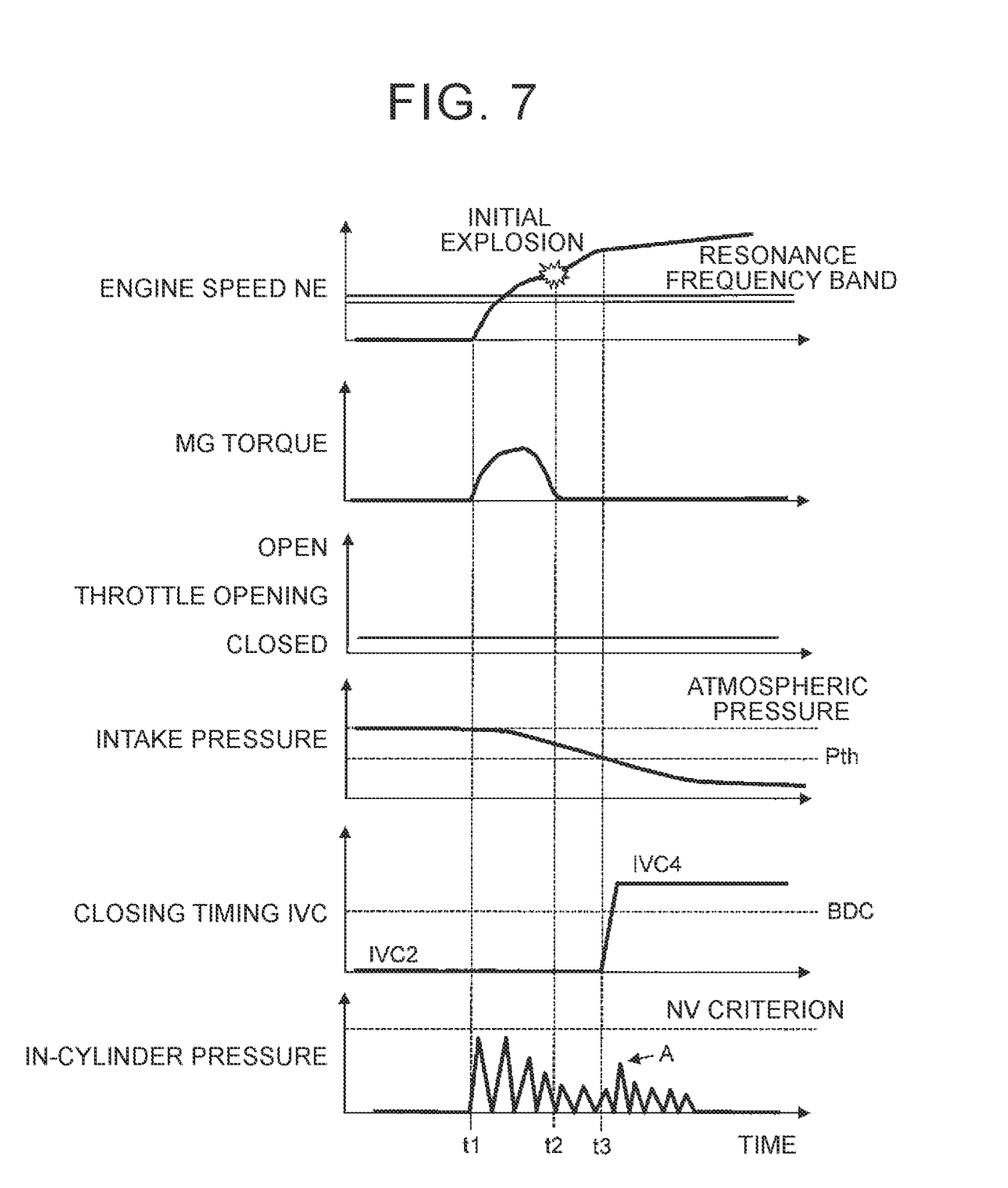
FIG. 7 is a time chart illustrating the intake valve timing control when the engine is started in the decompression mode.

FIG. 7 is a time chart illustrating intake valve timing control at the time of engine start with the decompression mode executed. In FIG. 7, time t1 corresponds to a point in time at which cranking is started in response to a request for engine start. As one example, switching to the closing timing IVC2 for the decompression mode is performed in the course of stopping the engine (in a period in which the engine speed NE is reduced after fuel cut) before the engine is started this time. However, in an internal combustion engine, like the internal combustion engine 10, having the electric VVT 38 capable of adjusting the closing timing IVC even during engine stop, switching to the closing timing IVC2 may be performed during engine stop.

In the example shown in FIG. 7, cranking is performed, using torque of the MG 12. The engine speed NE increases as cranking starts. Since the throttle valve 24 is closed, the intake pressure (intake manifold pressure) is reduced from the atmospheric pressure established during engine stop.

Peaks of rises and falls of the in-cylinder pressure, which are repeated in the waveform of the in-cylinder pressure in FIG. 7, conceptually represent peaks in the in-cylinder pressure during the compression stroke and expansion stroke of each cylinder, which peaks come sequentially according to a predetermined explosion order (the number of peaks of the in-cylinder pressure indicated in FIG. 7 is different from the actual number of cycles). At the start of cranking, the intake pressure is relatively high (is equal to the atmospheric pressure); therefore, peak values of the in-cylinder pressure are relatively high, as shown in FIG. 7. Then, the peak value of the in-cylinder pressure is reduced as the intake pressure is reduced.

Once the engine speed NE goes beyond a resonance frequency band, fuel injection and ignition are started. The resonance frequency band is a rotational speed range in which resonance of the powertrain occurs due to compression (excitation force) of each cylinder. Time t2 corresponds to a point in time at which the initial explosion occurs in a certain cylinder, as the fuel injection and ignition are started. As combustion starts, the engine speed NE keeps increasing after time t2, and complete explosion is determined at a given rotational speed (not shown) (completion of engine start-up). Then, the engine speed NE reaches an idling region. In the example shown in FIG. 7, since decompression is performed, the in-cylinder pressure during cranking does not exceed a predetermined Noise and Vibration (NV) criterion. The NV criterion is an in-cylinder pressure value associated with the permissible upper limit of vehicle floor vibration.

Time t3 that comes after time t2 corresponds to a point in time at which the intake pressure is reduced down to a predetermined threshold value Pth after completion of engine start-up (after complete explosion is determined). In this embodiment, as one example, switching from the closing timing IVC2 for the decompression mode to the closing timing IVC4 for the early closing mode is started at time t3. The threshold value Pth is one example of the "threshold value" according to the disclosure.

More specifically, the timing of switching from the closing timing IVC2 to the closing timing IVC4 may be set as desired, provided that it is after the engine speed NE goes beyond the resonance frequency band, and may be before start of fuel injection. In this embodiment, the switching is not immediately performed when the engine speed NE goes beyond the resonance frequency band, but is performed when the intake pressure is reduced down to the threshold value Pth, for the reason as follows. The actual compression ratio of the internal combustion engine 10 reaches a maximum when the closing timing IVC passes the BDC; as a result, the in-cylinder pressure has a high peak value, as conceptually indicated by symbol "A" in FIG. 7. If the peak value becomes high when the closing timing IVC passes the BDC since the actual compression ratio is high, knocking is likely to take place. Thus, the threshold value Pth of the intake pressure is determined as a value required for curbing knocking when the closing timing IVC passes the BDC in the process of switching (more specifically, reducing the intensity and frequency of knocking to respective predetermined levels or lower). In this connection, the occurrence of knocking immediately after engine start becomes more noticeable when the mechanical compression ratio (the compression ratio determined by the relationship between the minimum volume and maximum volume of the cylinder) is increased for increase of the expansion ratio of the Miller cycle engine.

The closing timing IVC during engine operation after switching to the closing timing IVC4 is controlled with the early closing amount commensurate with the engine operating conditions (the early closing mode).

1-2-5. Processing of Controller

Figure 8:
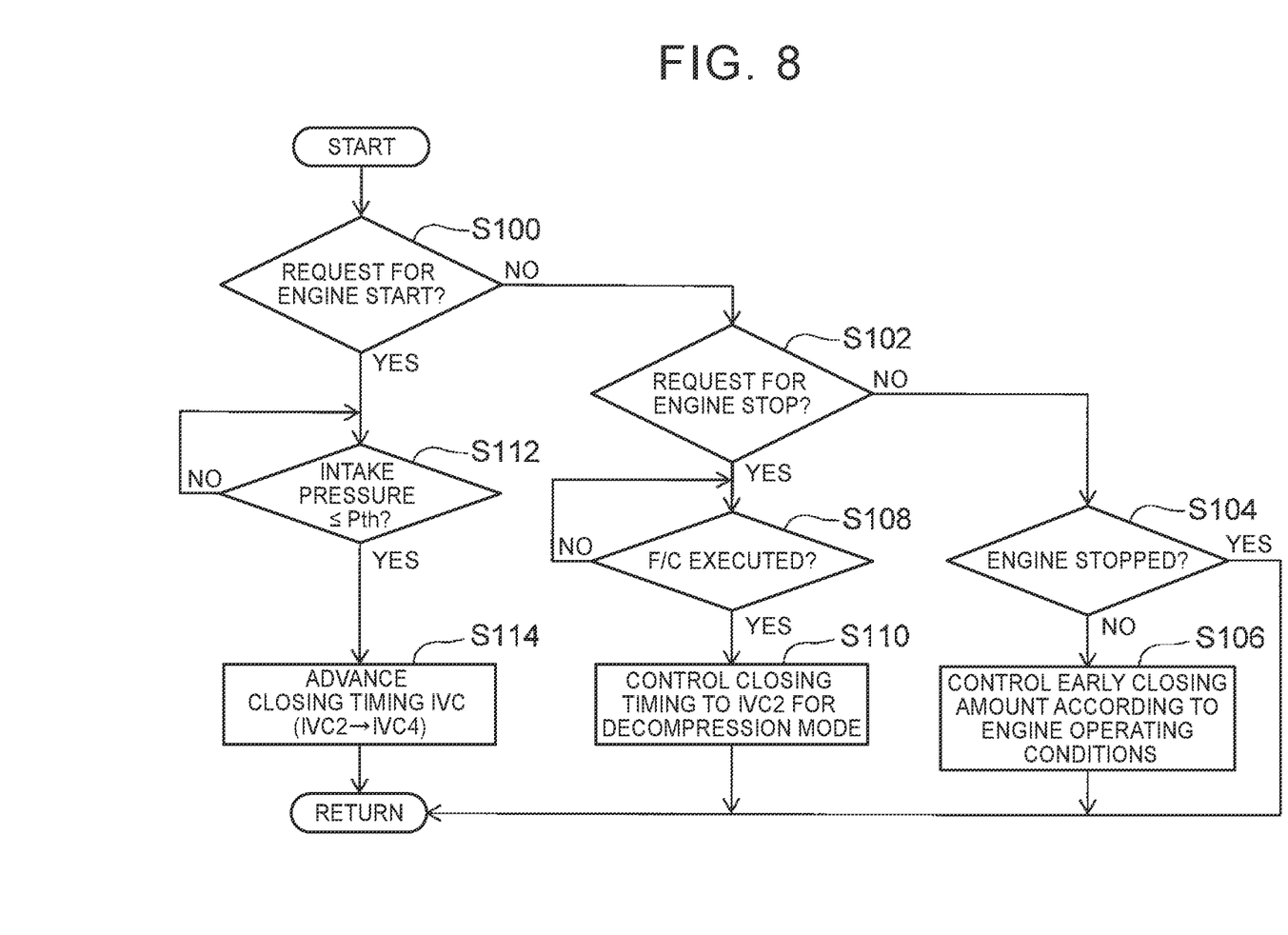
FIG. 8 is a flowchart illustrating a control routine concerning the intake valve timing control according to the first embodiment of the disclosure.

FIG. 8 is a flowchart illustrating a control routine concerning the intake valve timing control according to the first embodiment. The routine of FIG. 8 is repeatedly executed during start-up of the system of the hybrid vehicle including the internal combustion engine 10.

In the routine shown in FIG. 8, the controller 50 initially determines whether a request for engine start has been generated (step S100). More specifically, in the hybrid vehicle, the presence or absence of a start command generated from the controller 50 to the internal combustion engine 10 is determined.

When a negative decision (NO) is obtained in step S100, the controller 50 then determines whether a request for engine stop has been generated (step S102). More specifically, the presence or absence of an operation stop command generated from the controller 50 to the internal combustion engine 10 is determined. The operation stop command includes a command to intermittently stop the internal combustion engine 10 during start-up of the vehicle system. When there is no request for engine stop, the controller 50 determines whether the engine is stopped (the engine speed NE is equal to zero) (step S104).

When a negative decision (NO) is obtained in step S104, namely, when neither the engine start request nor the engine stop request is made, and the engine is not stopped (namely, when the engine is in normal operation after engine start-up), the control proceeds to step S106. In step S106, the controller 50 controls the electric VVT 38 (in the early closing mode) so as to provide the closing timing IVC of the early closing amount commensurate with the engine operating conditions (early closing mode). The control of the closing timing IVC is performed by changing the rotation phase of the camshaft relative to the rotation phase of the crankshaft, based on the signals of the crank angle sensor 52 and the cam angle sensor 40, for example.

On the other hand, when an affirmative decision (YES) is obtained in step S102, the control proceeds to step S108. When the engine stop request is generated, fuel cut (F/C) for engine stop is carried out, based on a command from the controller 50. In step S108, the controller 50 determines whether the fuel cut is carried out.

Step S108 is repeatedly executed until the F/C is started. On the other hand, when execution of the F/C is recognized, the control proceeds to step S110. In step S110, the controller 50 executes late closing, using the electric VVT 38, so that the closing timing IVC becomes equal to the closing timing IVC2 for the decompression mode (decompression mode). With this processing, the closing timing IVC can be controlled in advance to the closing timing IVC2 for the decompression mode, for the time when the engine is re-started later on. While the closing timing IVC2 is a fixed value as one example, it may be changed according to certain engine operating conditions.

On the other hand, when an affirmative decision (YES) is obtained in step S100, the control proceeds to step S112. Once the engine start request is generated, cranking, fuel injection, and ignition for engine start-up are performed, based on commands from the controller 50. In step S112, the controller 50 determines whether the intake pressure has become equal to or lower than the above-mentioned threshold value Pth for the first time after completion of engine start-up.

Step S112 is repeatedly executed as long as the intake pressure has not been reduced to the threshold value Pth or lower. On the other hand, when reduction of the intake pressure to the threshold value Pth or lower is recognized, the control proceeds to step S114. In step S114, the controller 50 performs switching (advancing) of the closing timing IVC from IVC2 to IVC4, using the electric VVT 38. As a result, the early closing mode is started.

1-3. Effect

According to the first embodiment as described above, the Miller cycle engine (the internal combustion engine 10) that is operable in the early closing mode using the electric VVT 38 of the "fixed operation angle type" exceptionally performs late closing of the intake valve 36 when the decompression mode is executed. The late closing amount D for the decompression mode is larger than the early closing amount MAX at the time when the closing timing is most advanced, as shown in FIG. 6. Therefore, according to this embodiment, decompression is performed which provides a higher pressure reduction effect than that at the time of use of the early closing amount MAX, without requiring enlargement of the valve recess (without a need to increase the early closing amount MAX for the decompression mode). As a result, it is possible to establish both the early closing Miller cycle operating mode and the decompression mode, while avoiding reduction of turbulence of the in-cylinder gas due to enlargement of the valve recess and the resulting combustion deterioration, without using the mechanism of the variable operation angle type.

Also, according to this embodiment, switching from the decompression mode to the early closing mode (switching from IVC2 to IVC4) is carried out after the intake pressure is reduced to be equal to or lower than the threshold value Pth for the first time after completion of engine start-up. With this processing, the intake pressure at the time when the closing timing IVC passes the BDC in the course of switching can be reduced. As a result, knocking is less likely or unlikely to occur due to increase of the actual compression ratio at the time when the closing timing IVC passes the BDC.

Also, according to this embodiment, when the decompression mode is implemented, the closing timing IVC is controlled with a large late closing amount D that is equal to or larger than 90° and smaller than 180°, by using the electric VVT 38 capable of changing the closing timing IVC within a broad variable range. Thus, the Miller cycle engine that basically operates in the early closing mode can perform decompression that can provide an excellent pressure reduction effect while solving problem concerning enlargement of the valve recess.

2. Second Embodiment

Figure 9:
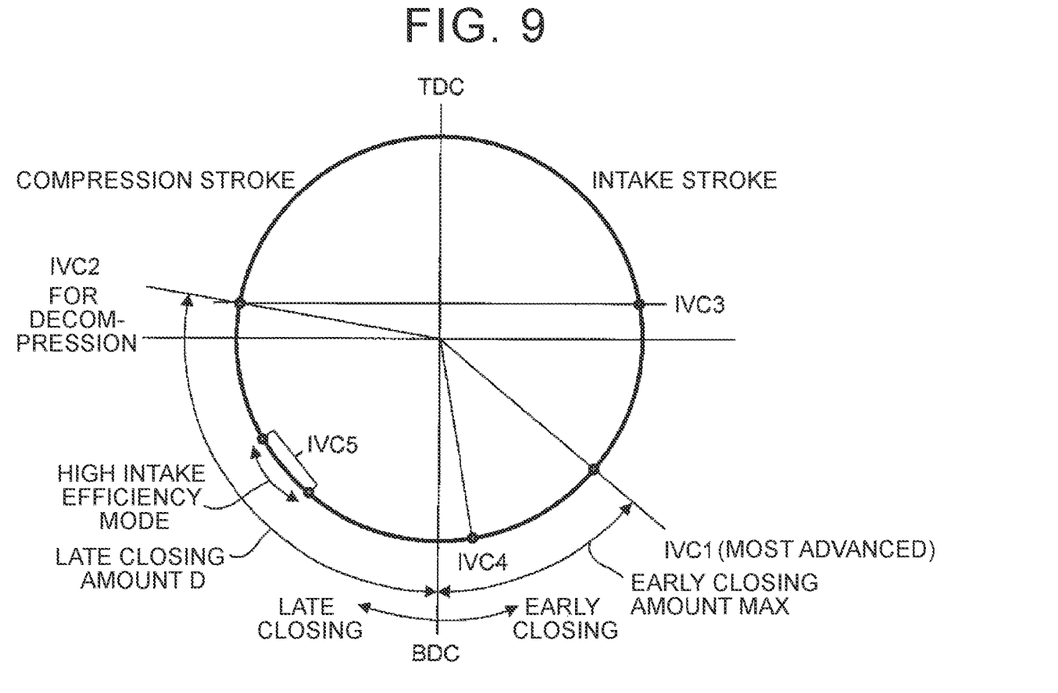
FIG. 9 is a view showing setting and control range of the closing timing IVC used in intake valve timing control of a second embodiment of the disclosure.
Figure 10:
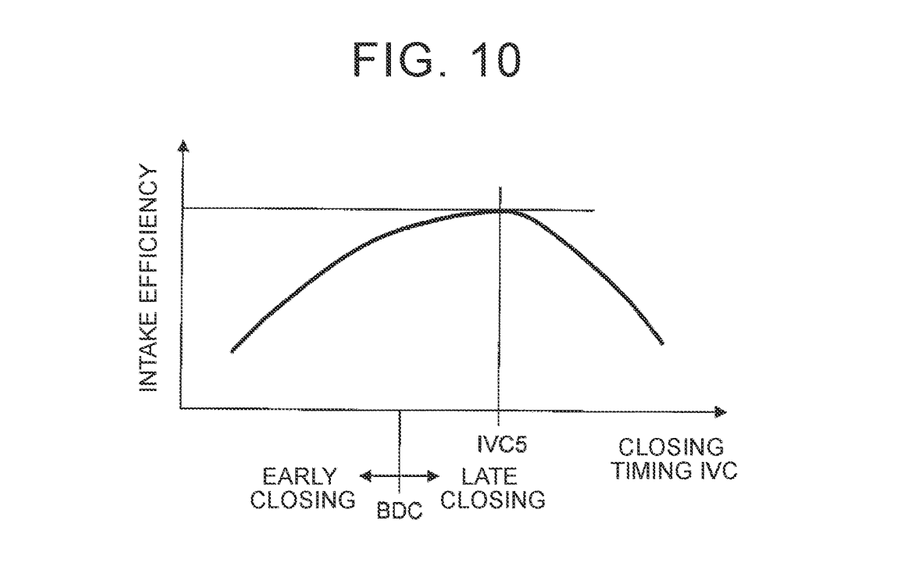
FIG. 10 is a view showing the relationship between the intake efficiency of an internal combustion engine and the closing timing IVC at the same engine speed NE.
Figure 11:
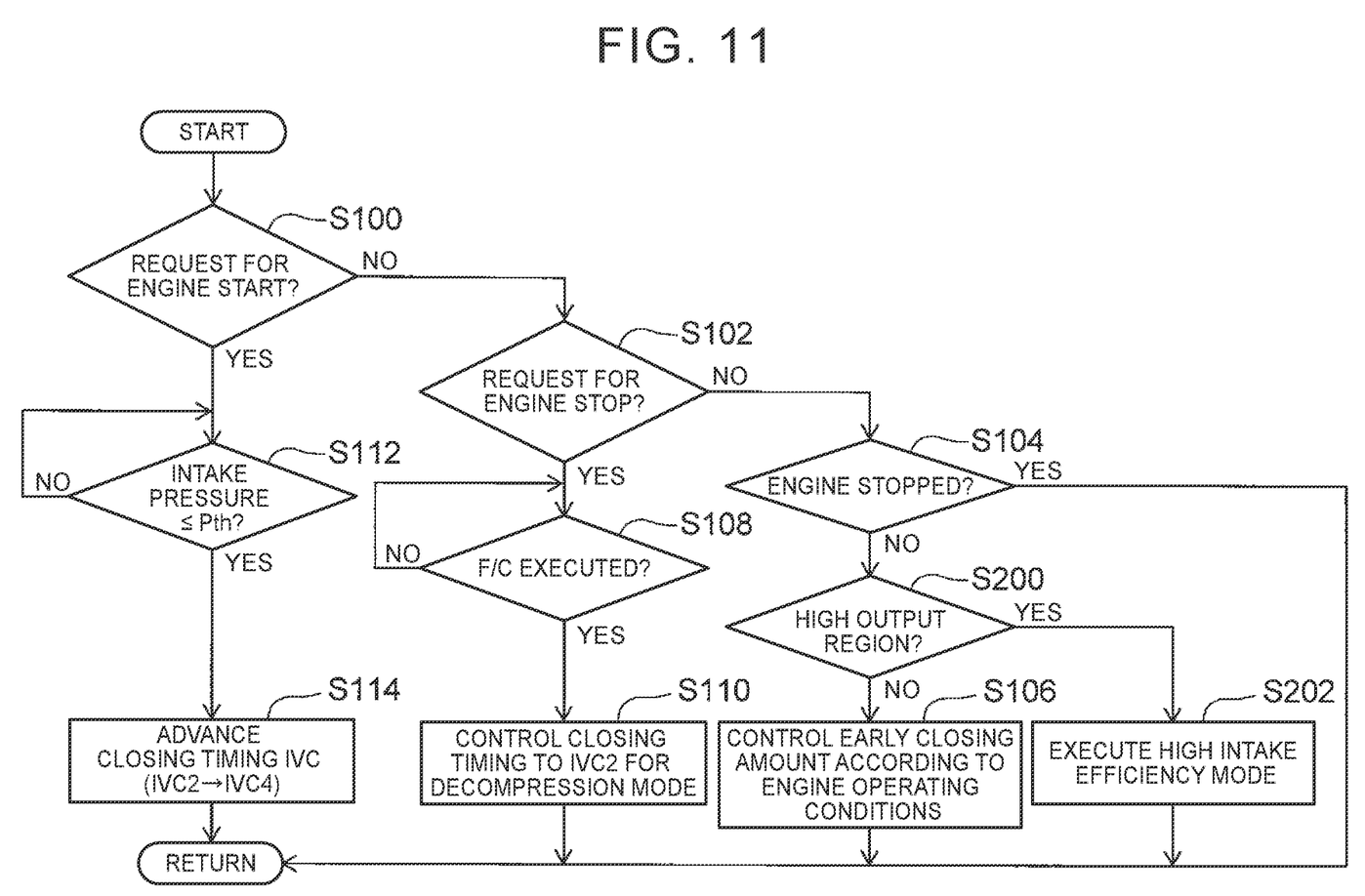
FIG. 11 is a flowchart illustrating a control routine concerning the intake valve timing control according to the second embodiment of the disclosure.

Referring to FIG. 9 through FIG. 11, a second embodiment of the disclosure will be described. In the following description, the configuration shown in FIG. 1 is supposed to be used, as one example of the hardware configuration of a system according to the second embodiment.

2-1. Summary of Intake Valve Timing Control of Second Embodiment

FIG. 9 shows setting and control range of the closing timing IVC used in the intake valve timing control of the second embodiment. In this embodiment, the "early closing mode" is basically implemented in the same manner as in the first embodiment, during engine operation. However, in a given high output region located on the high-load high-rotational-speed side, a "high intake efficiency mode" as described below is implemented, in place of the "early closing mode".

FIG. 10 shows the relationship between the intake efficiency (intake-air charging efficiency) of the internal combustion engine 10 and the closing timing IVC at the same engine speed NE. As shown in FIG. 10, the closing timing IVC (which will be called "IVC5") that provides the highest intake efficiency at the same engine speed NE is on the retard side of the BDC due to an inertia effect of intake air. More specifically, the closing timing IVC5 is retarded as the engine speed NE is higher. The closing timing IVC5 is one example of the "specific closing timing" according to the disclosure.

In the high intake efficiency mode, the closing timing IC5 is used, in place of the closing timing IVC that is earlier than the BDC, so as to meet a high engine output requirement made in a high output region of the internal combustion engine 10. FIG. 9 shows a variable range (e.g., 40° to 60° ABDC) of the closing timing IVC5 used in the high output region. More specifically, the closing timing IVC5 in the example shown in FIG. 9 is 40° ABDC when the engine speed NE is the minimum value in the high output region, and is 60° ABDC when the engine speed NE is the maximum value in the high output region.

As described above, in this embodiment, the above "high intake efficiency mode" is used, along with the "early closing mode" and the "decompression mode", during engine operation. Namely, during engine operation, late closing of the intake valve 36 is performed in the "high intake efficiency mode", as well as the "decompression mode", unlike the first embodiment. Thus, in this embodiment, the closing timing IVC is retarded to be later than the closing timing IVC5, only when the decompression mode is executed.

2-2. Processing of Controller

FIG. 11 is a flowchart illustrating a control routine concerning intake valve timing control according to the second embodiment. Step S100 through step S114 in the routine shown in FIG. 11 have been described above in connection with the first embodiment.

In the routine shown in FIG. 11, when a negative decision (NO) is obtained in step S104 (when the engine is in normal operation), the control proceeds to step S200. In step S200, the controller 50 determines whether the current operating region specified by the engine load and the engine speed NE is a predetermined high output region. The engine load (the amount of air filling the cylinder) can be obtained by inputting parameters including the engine speed NE and the intake air flow detected by the air flow sensor 54, into a known physical model of an intake system, for example.

When a negative decision (NO) is obtained in step S200 (when the current operating region is not the high output region), the control proceeds to step S106, and the early closing mode is executed.

On the other hand, when an affirmative decision (YES) is obtained in step S202 (when the current operating region is the high output region), the control proceeds to step S202. In step S202, the controller 50 controls the electric VVT 38 so that the closing timing IVC becomes the closing timing IVC5, for execution of the high intake efficiency mode. The closing timing IVC5 that provides the highest intake efficiency is dependent on the engine speed NE (piston velocity) as described above. Thus, the closing timing IVC5 corresponding to the current engine speed NE can be obtained by setting in advance the relationship between the closing timing IVC5 and the engine speed NE, for example.

2-3. Effect

According to the second embodiment as described above, the Miller cycle engine that utilizes the high intake efficiency mode so as to sufficiently meet a high output requirement can perform decompression that provides a higher pressure reduction effect than that at the time when the early closing amount MAX is used, without requiring enlargement of the valve recess. The second embodiment also yields other effects similar to those of the first embodiment.

2-4. Another Example of High Intake Efficiency Mode

In the example of the high intake efficiency mode according to the second embodiment, the intake valve 36 is closed at the closing timing IVC5 (specific closing timing) that provides the highest intake efficiency at each engine speed NE within the high output region. However, the intake valve 36 in another example of the high intake efficiency mode may be closed at a certain closing timing IVC that is later than the BDC and earlier than the closing timing IVC5 (specific closing timing). Namely, the late closing amount of the intake valve 36 used in the high intake efficiency mode may be equal to or smaller than the late closing amount at the specific closing timing.

3. Other Embodiments

3-1. Another Example of the Amount of Change of Closing Timing IVC

In the first and second embodiments as described above, when the decompression mode is executed, the closing timing IVC is controlled so as to provide the late closing amount D within the range equal to or larger than 90° and smaller than 180°. However, the "late closing amount" in the decompression mode to which the disclosure is applied is not necessarily limited to the above example, but may be smaller than 90°, provided that a condition that "the late closing amount is larger than the early closing amount of the intake valve relative to the intake bottom dead center when the closing timing of the intake valve is most advanced by the variable valve mechanism" is satisfied.

3-2. Another Example of Variable Valve Mechanism

The "variable valve mechanism" to which the disclosure is applied may be a hydraulic mechanism, in place of an electrically operated one, such as the electric VVT 38, provided that it is of the "fixed operation angle type", namely, it is configured "to make the opening and closing timing of the intake valve variable while fixing the operation angle of the intake valve". More specifically, a typical hydraulic mechanism includes a plurality of (at least three) vanes formed so as to protrude in radial directions at equal angular intervals at one end of a camshaft, and a cam pulley having a plurality of hydraulic chambers that house the respective vanes. Then, the rotation phase of the camshaft (vane) relative to the rotation phase of the crankshaft (cam pulley) is changed by using a hydraulic pressure applied to each of the hydraulic chambers. In the hydraulic mechanism, the hydraulic chambers need to be defined and formed in the circumferential direction of the camshaft. Therefore, the variable range of the closing timing IVC is limited in terms of structure, and its limit value is about 70° to 80° in crank angle. If the "late closing amount" that satisfies the condition explained in the above section 3-1 can be realized within the variable range of the closing timing IVC provided by the hydraulic mechanism, the hydraulic mechanism may be used. In other words, the use of the electric VVT 38 having a high degree of freedom in the variable range of the closing timing IVC makes it possible to implement the decompression mode with the large late closing amount of 90° or larger, like the above-indicated "late closing amount D".

3-3. Another Example of Intake Valve Timing Control

The intake valve 36 in the first embodiment is closed later than the BDC only when the decompression mode is executed. Also, the intake valve 36 in the second embodiment is closed later than the "IVC5 (specific closing timing)" only when the decompression mode is executed. However, the "intake valve timing control" according to the disclosure is not necessarily limited to the above examples, provided that the decompression mode is executed using the "late closing amount" that satisfies the condition described in the above section 3-1. Namely, the intake valve may be closed later than the "intake bottom dead center" or the "specific closing timing", under other exceptional conditions other than the decompression mode.

Also, the variable range of the closing timing IVC used in the "early closing Miller cycle operating mode" according to the disclosure may include the BDC, in place of the examples of the first and second embodiments in which the variable range does not include the BDC. Namely, in the early closing Miller cycle operating mode, the intake valve may be controlled to be closed at or before the intake bottom dead center.

3-4. Another Example of System Configuration

The "Miller cycle engine" according to the disclosure may be employed in a vehicle that uses only the Miller cycle engine as a power source, in place of the hybrid vehicle as described in the first embodiment and the second embodiment. Also, the "Miller cycle engine" according to the disclosure is not necessarily limited to the spark ignition type, but may be of a compression ignition type, or a naturally aspirated engine having no supercharger, such as the turbocharger 20.

The examples described in the illustrated embodiments and other modified examples may be combined as needed if possible, other than the specified combinations, and may be modified in various forms without departing from the principle of the disclosure.

What is claimed is:

1. A control system of a Miller cycle engine, the Miller cycle engine including a variable valve mechanism configured to make an opening timing and a closing timing of an intake valve variable while fixing an operation angle of the intake valve, the control system comprising
an electronic control unit configured to:
execute an early closing Miller cycle operating mode in which the electronic control unit controls the variable valve mechanism to close the intake valve before an intake bottom dead center;
execute a decompression mode in which the electronic control unit controls the variable valve mechanism to close the intake valve at a point later than the intake bottom dead center, when the Miller cycle engine is started, a later closing amount of the intake valve relative to the intake bottom dead center, for use in the decompression mode, being larger than an early closing amount of the intake valve relative to the intake bottom dead center at a time when the closing timing of the intake valve is most advanced by the variable valve mechanism; and
execute the early closing Miller cycle operating mode after completion of the decompression mode.

2. The control system according to claim 1, wherein the electronic control unit is configured to control the variable valve mechanism such that the intake valve is closed at the point later than the intake bottom dead center, only when the decompression mode is executed.

3. The control system according to claim 1, wherein:
the electronic control unit is configured to execute a high intake efficiency mode, in place of the early closing Miller cycle operating mode, in a high output region of the Miller cycle engine;
in the high intake efficiency mode, the intake valve is closed at a specific closing timing that is on a retard side of the intake bottom dead center and provides a highest intake efficiency of intake air at a same engine speed, or at a closing timing that is later than the intake bottom dead center and earlier than the specific closing timing; and
the electronic control unit is configured to control the variable valve mechanism such that the intake valve is closed at a point later than the specific closing timing, only when the decompression mode is executed.

4. The control system according to claim 1, wherein:
the Miller cycle engine includes a throttle valve placed in an intake passage; and
the electronic control unit is configured to perform switching from the decompression mode to the early closing Miller cycle operating mode, after a pressure in the intake passage downstream of the throttle valve is reduced to a level equal to or lower than a threshold value for the first time after completion of engine start-up.

5. The control system according to claim 1, wherein:
the variable valve mechanism is an electric variable valve timing mechanism including an electric motor that changes a rotation phase of a camshaft relative to the rotation phase of a crankshaft; and
the late closing amount used in the decompression mode is equal to or larger than 90° and smaller than 180° in crank angle.

6. The control system according to claim 1, wherein the operation angle of the intake valve is within a range of 170° to 200° in crank angle.

7. The control system according to claim 6, wherein a lift amount of the intake valve is within a range of 6 to 10 mm.

8. A method of controlling a Miller cycle engine, the Miller cycle engine including an electronic control unit, and a variable valve mechanism configured to make an opening timing and a closing timing of an intake valve variable while fixing an operation angle of the intake valve, the method comprising:
executing, by the electronic control unit, an early closing Miller cycle operating mode such that the variable valve mechanism is controlled to close the intake valve before an intake bottom dead center;
executing, by the electronic control unit, a decompression mode such that the variable valve mechanism is controlled to close the intake valve at a point later than the intake bottom dead center, when the Miller cycle engine is started, a later closing amount of the intake valve relative to the intake bottom dead center, for use in the decompression mode, being larger than an early closing amount of the intake valve relative to the intake bottom dead center at a time when the closing timing of the intake valve is most advanced by the variable valve mechanism; and
executing, by the electronic control unit, the early closing Miller cycle operating mode after completion of the decompression mode.

* * * * *